United States Patent

[11] 3,589,705

| [72] | Inventor | Hugh M. Parker |
| --- | --- | --- |
| | | 718 Cherokee St., Talladega, Ala. 35160 |
| [21] | Appl. No. | 821,920 |
| [22] | Filed | May 5, 1969 |
| [45] | Patented | June 29, 1971 |

[54] APPARATUS SUPPORTING RIM MOUNTED TIRE ROTATION IN PREDETERMINED PLANE
6 Claims, 4 Drawing Figs.

| [52] | U.S. Cl. | 269/20, |
| --- | --- | --- |
| | | 144/288 A, 157/1.1, 269/22, 269/48.1 |
| [51] | Int. Cl. | B23q 3/08 |
| [50] | Field of Search | 269/20, 22, |
| | | 48.1, 52; 242/72 B; 144/288.1; 18/2 TS, 2 TT |

[56] References Cited
UNITED STATES PATENTS
2,934,114  4/1960  Robertson .................. 144/288.1

*Primary Examiner*—Andrew R. Juhasz
*Assistant Examiner*—Donald D. Evenson
*Attorney*—Jennings, Carter & Thompson ABSTRACT: Apparatus supporting rim-mounted tire for rotation in predetermined plane including supporting spindle with rigid annular member surrounding spindle and supported thereby for rotation in plane perpendicular to spindle. Annular, inflatable member between rigid annular member and rim secures rim to rigid annular member.

PATENTED JUN29 1971  3,589,705
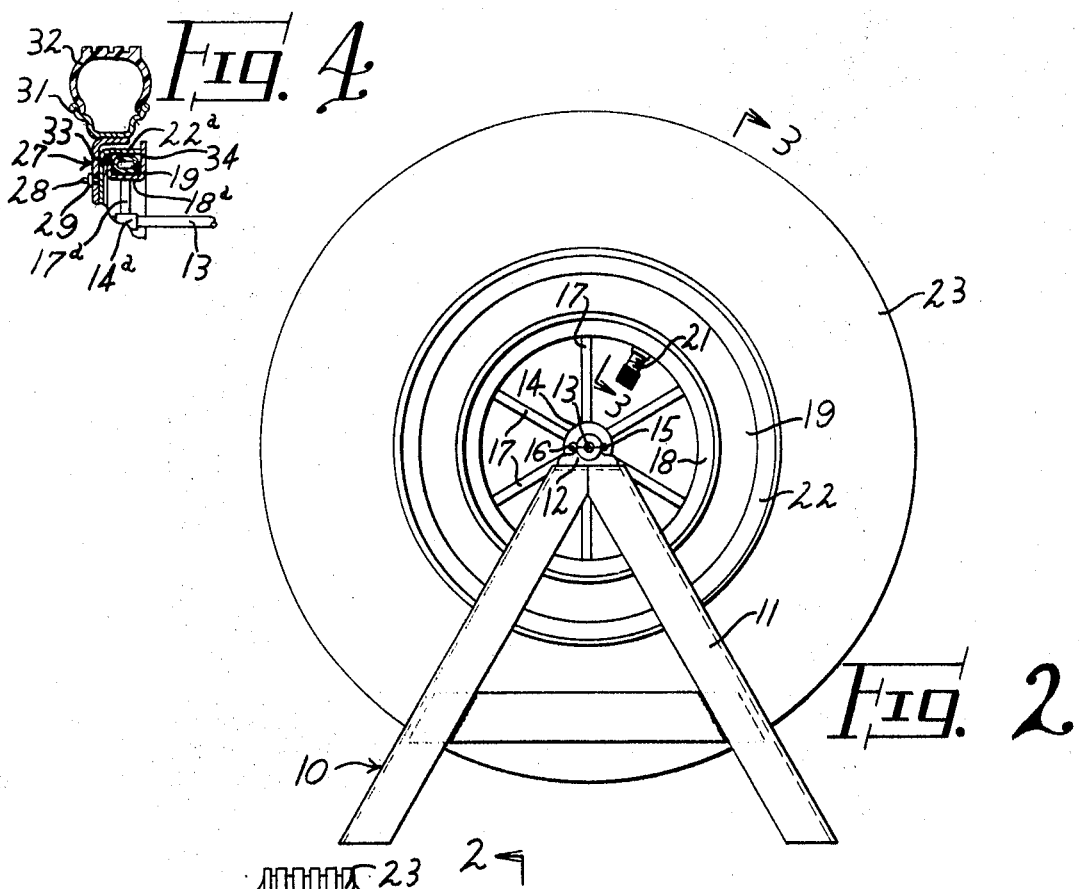
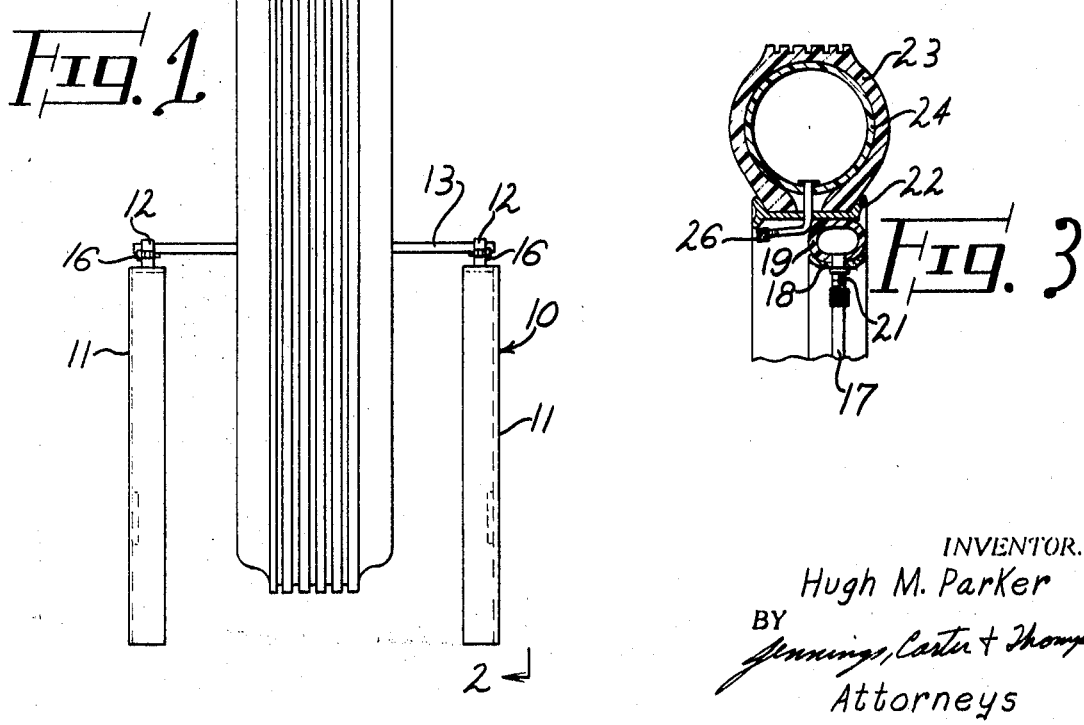
INVENTOR.
Hugh M. Parker
BY Jennings, Carter & Thompson
Attorneys

APPARATUS SUPPORTING RIM MOUNTED TIRE ROTATION IN PREDETERMINED PLANE

BACKGROUND OF THE INVENTION

This invention relates to apparatus for supporting a rim-mounted tire for rotation in a predetermined plane and more particularly to apparatus for supporting a vehicle tire mounted on a rim for balancing, buffing and the like.

Heretofore in the art to which my invention relates, difficulties have been encountered in balancing tires on heavy trucks due to the fact that the tires are mounted on generally cylindrical rims which are detachably connected to the spokes of the vehicle whereby upon removing the tire and its rim, there is no means for supporting the wheel at its axis of rotation. While various mechanical devices have been proposed for attachment to the rim to provide a central axis about which the tire is rotated, such devices are very difficult to install whereby the tire and its rim will rotate in a predetermined plane perpendicular to the axis of rotation. Due to the difficulty in mounting heavy truck tires for rotation in a predetermined plane perpendicular to the axis of rotation, the cost of balancing or buffing rim-mounted truck tires is very extensive and time consuming.

BRIEF SUMMARY OF INVENTION

In accordance with my invention, I provide a supporting spindle with a rigid annular member surrounding and supported by the spindle for rotation in a plane perpendicular to the spindle. An annular, inflatable member having concentric inner and outer surfaces is mounted between the rigid annular member and the rim on which the tire is mounted whereby the rim is secured to and rotates with the rigid annular member in said predetermined plane.

Apparatus embodying features of my invention is illustrated in the accompanying drawing, forming a part of this application, in which:

FIG. 1 is an end elevational view of the apparatus showing a rim mounted vehicle tire mounted thereon;

FIG. 2 is a side elevational view taken generally along the line 2-2 of FIG. 1;

FIG. 3 is a fragmental, sectional view taken generally along the line 3-3 of FIG. 2; and, FIG. 4 is a fragmental view corresponding to FIG. 3, but showing the rim member as being in the form of a brake drum.

Referring now to the drawing for a better understanding of my invention, I show a supporting frame 10 which may be in the form of A frames 11 which are mounted in spaced relation to each other, as shown in FIG. 1. Mounted on the top of each A frame 11 is a bearing unit 12 for receiving opposite ends of a spindle 13. As shown in FIGS. 1 and 2, each bearing unit 12 is split whereby the upper portion thereof is adapted to pivot about a hinge 15 for insertion and removal of the spindle 13. The elements of the split bearing unit 12 at the opposite side thereof from the hinge 15 are detachably connected to each other by a removable pin 16.

Mounted on the central portion of the spindle 13 is a hub 14 having radially extending spokelike members 17. The outer ends of the spokelike members 17 are secured to a rigid, annular member 18 whereby the hub 14 is secured rigidly to the annular member 18 with the annular member 18 rotating in a plane perpendicular to the spindle 13. It will be apparent that the hub 14 may be mounted for rotation on the spindle 13, or the spindle may rotate in the bearing units 12.

Surrounding the rigid, annular member 18 is an annular inflatable member 19 having concentric inner and outer surfaces with the inner surface engaging the outer surface of the rigid annular member 18, as shown in FIG. 3. The annular, inflatable member 19 is tubular and formed of an expandable material, such as rubber. A valve stem 21 having a conventional type check valve therein communicates with the tubular, inflatable member 19 whereby air may be introduced therein or exhausted therefrom.

To mount a rim-mounted tire whereby it rotates with the annular member 18 in a plane perpendicular to the axis of the spindle 13, the rim, indicated at 22 carrying a conventional type pneumatic tire 23, is positioned around the outer surface of the tubular, flexible member 19, as shown in FIG. 3. That is, the inflatable member 19 is deflated at the time the rim 22 is positioned around the inflatable member 19, whereby upon introducing air into the valve stem 21, the inflatable member 19 expands to firmly secure the rim 22 to the annular member 18 whereby the tire 23 and its rim 22 rotate in a plane perpendicular to the axis of the spindle 13. As shown in FIG. 3, the pneumatic tire is shown as having an innertube 24 with a conventional type valve stem 26 communicating therewith for inflating the tire. By mounting the annular member 18 and the tubular member 19 at one side of the rim 22, as shown in FIG. 3, the inflatable tube 19 is easily installed without interferring with the valve stem 26 where such valve stems are employed.

From the foregoing description, the operation of my improved apparatus for supporting a rim-mounted tire for rotation in a predetermined plane will be readily understood. The tire 23 and its rim 22 are removed from the vehicle in the usual manner. The spindle 13 is removed from its bearing members by releasing the pins 16 and the rim 22 with the tire 23 mounted thereon is then placed about the inflatable, annular member 19 while the member 19 is in collapsed position. The inflatable member 19 is aligned whereby the sides thereof are parallel to the sides of the rim 22 and air is then introduced into the inflatable member 19 whereupon it engages the inner surface of the rim 22 to thus firmly connect the rim 22 to the annular member 18. Since the annular member 18 is mounted on the spindle whereby it rotates in a plane perpendicular to the axis of the spindle 13, the parallel alignment of the sides of the inflatable member 19 with the sides of the rim 22 cause the rim 22 and the tire 23 supported thereby to also rotate in a plane perpendicular to the axis of the spindle 13. With the tire 23 and its rim 22 thus mounted for rotation in a predetermined plane, the tire is then balanced by employing conventional type wheel-balancing equipment, or the outer surface of the tire may be buffed whereby the outer surface of the tire is concentric with the axis of the spindle 13.

In FIG. 4 of the drawing I show the rim member as being a brake drum 22a connected to a wheel unit 27 by the usual bolts 28 having nuts 29. The wheel 27 carries the usual rim 31 and pneumatic tire 32. Mounted within the rim 22a is the inflatable member 19 described above. The member 19 is carried by an annular member 18a having outwardly extending flanges 33 and 34 for receiving the member 19 therebetween. The flange 34 extends outwardly alongside the brake drum 22a to align the member 19 therewith. The annular member 18a is mounted on spokes 17a carried by hub 14a which is mounted on spindle 13. It will thus be seen that the term rim or rim-mounted tire includes any annular flangelike or rimlike member which rotates with the tire and is adapted to receive the annular expandable member 19.

From the foregoing, it will be seen that I have devised improved apparatus for supporting a rim-mounted tire for rotation in a predetermined plane. By providing an inflatable, annular member having concentric outer and inner surfaces, between the outer surface of the annular member 18 and the inner surface of the rim 22, my improved apparatus is adapted for use with rims of various diameters. That is, the inflatable, annular member 19 will compensate for the differences in diameters of the various rims 22 employed. Also, by providing apparatus which may be readily disassembled and assembled with a minimum of time and effort, the rim-supported tires can be quickly and accurately balanced, buffed or the like, thus greatly reducing the overall cost of such operations. Furthermore, by mounting the annular, expandable member 19 at one side of the rim 22 and in parallel alignment with the side of the rim the rim-mounted tire may be easily mounted on the apparatus even though the valve stem of the tire extends inwardly of the rim.

While I have shown my invention in but one form, it will be obvious to those skilled in the art that it is not so limited, but is susceptible of various other changes and modifications without departing from the spirit thereof.

I claim:

1. The combination with a rigid rim of a rim-mounted tire mounted for rotation in a predetermined planes,
   a. a supporting spindle extending perpendicular to said predetermined plane,
   b. a rotatable hub mounted on said spindle,
   c. a rigid annular member surrounding said hub,
   d. means connecting said hub to said rigid annular member with said hub and said rigid annular member rotatable about a common axis in said predetermined plane and perpendicular to said common axis,
   e. an annular inflatable member having concentric inner and outer surfaces with said inner surface engaging the outer surface of said rigid annular member and said outer surface engaging the inner surface of said rigid rim, and
   f. means to inflate said inflatable member to secure said rim to said rigid annular member for rotation therewith.

2. The combination with a rigid rim of a rim-mounted tire as defined in claim 1 in which said hub is connected rigidly to said rigid annular member by radially extending members.

3. The combination with a rigid rim of a rim-mounted tire as defined in claim 1 in which said annular inflatable member is an annular tube having means for introducing air therein and exhausting air therefrom.

4. The combination with a rigid rim of a rim-mounted tire as defined in claim 1 in which the annular inflatable member is of a diameter, as viewed in cross section, to engage only one side of the inner surface of said rigid rim.

5. The combination with a rigid rim of a rim-mounted tire as defined in claim 1 in which said rigid rim is carried by a wheel unit.

6. The combination with a rigid rim of a rim-mounted tire as defined in claim 5 in which said rigid annular member carries flanges which extend outwardly along opposite sides of said annular inflatable member.